United States Patent [19]
Farrell et al.

[11] Patent Number: 5,553,448
[45] Date of Patent: Sep. 10, 1996

[54] INTERCOOLED GAS TURBINE ENGINE

[75] Inventors: William M. Farrell; Gary L. Leonard, both of Cincinnati, Ohio

[73] Assignee: General Electric Company, Cincinnati, Ohio

[21] Appl. No.: 301,363

[22] Filed: Sep. 6, 1994

Related U.S. Application Data

[63] Continuation of Ser. No. 139,329, Oct. 20, 1993, abandoned, which is a continuation of Ser. No. 883,322, May 14, 1992, abandoned.

[51] Int. Cl.$^6$ ........................................ F02C 1/06
[52] U.S. Cl. ........................ 60/39.161; 60/39.163; 60/728; 29/888; 29/401.1; 415/179
[58] Field of Search .................... 60/39.161, 39.163, 60/726, 728; 74/DIG. 5; 415/179; 29/888.011, 888.021, 888, 401.1

[56] References Cited

U.S. PATENT DOCUMENTS

| | | | |
|---|---|---|---|
| 2,575,683 | 11/1951 | Price | 60/35.6 |
| 2,755,621 | 7/1956 | Terrell | 60/39.16 |
| 2,756,561 | 7/1956 | Morley . | |
| 2,845,776 | 8/1958 | Traupel | 60/728 |
| 3,121,526 | 2/1964 | Morley . | |
| 3,527,053 | 9/1970 | Horn . | |
| 3,527,054 | 9/1970 | Hemsworth . | |
| 3,586,459 | 6/1971 | Zerlauth . | |
| 3,792,586 | 2/1974 | Kasmarik et al. . | |
| 4,005,575 | 2/1977 | Scott et al. . | |
| 4,244,191 | 1/1981 | Hendriks | 60/728 |
| 4,473,754 | 9/1984 | Joy | 290/54 |
| 4,509,324 | 4/1985 | Urbach et al. . | |

(List continued on next page.)

FOREIGN PATENT DOCUMENTS

| | | |
|---|---|---|
| 0512568 | 5/1992 | European Pat. Off. . |
| 2049054 | 4/1980 | United Kingdom . |

OTHER PUBLICATIONS

Matsumoto, Naofumi, "Theoretically Estimating the Optimum Division of the Pressure Ratio of Intercooling Type Gas Turbines", Bulletin of the JSME, vol. 20, No. 148, Oct. 1977, pp. 1306–1314.

Watts, J. W. and Bowen, T. L., "Regenerated Marine Gas Turbines, Part II: Regenerator Technology and Heat Exchanger Sizing", The American Society of Mechanical Engineers, 82–GT–314, pp. 1–8. Apr. 1982.

Bowen, T. L. and Ness, J. C., "Regenerated Marine Gas Turbines, Part I: Cycle Selection and Performance Estimation" The American Society of Mechanical Engineers, 82–GT–306, pp. 1–12. Jan. 1981.

Rice, I. G., "Thermodynamic Evaluation of Gas Turbine Cogeneration Cycles: Part II—Complex Cycle Analysis", The American Society of Mechanical Engineers, Dec. 26, 1985, 86–GT–7, pp. 8–15.

Howard, A. and Walker, C. J., "5000–KW Gas Turbine for Power Generation", The Society of Mechanical Engineers, Nov. 29–Dec. 3, 1948, 48–A–83, pp. 1–17.

Publication: "The ALF 502R Turbofan", Avco Lycoming Textron.

*Primary Examiner*—Richard A. Bertsch
*Assistant Examiner*—Ted Kim
*Attorney, Agent, or Firm*—Andrew C. Hess; Wayne O. Traynham

[57] ABSTRACT

A gas turbine engine having improved output horsepower and a method of achieving it. The engine has, in order, a low pressure compressor, a high pressure compressor, a combustor, a high pressure turbine and a low pressure turbine. The high pressure turbine is drivingly connected to both compressors with a speed reducing gear box therebetween. An intercooler between the compressors reduces the horsepower requirement of the high pressure compressor. Flow from the combustor is sufficiently heated to enable the high pressure turbine to drive both compressors with the output horsepower of the low pressure turbine devoted to the engine load.

19 Claims, 4 Drawing Sheets

U.S. PATENT DOCUMENTS

| | | |
|---|---|---|
| 4,537,023 | 8/1985 | Nakumura et al. . |
| 4,592,204 | 6/1986 | Rice . |
| 4,610,141 | 9/1986 | Wang . |
| 4,660,376 | 4/1987 | Johnson . |
| 4,661,042 | 4/1987 | Goloff ................................. 415/66 |
| 4,700,542 | 10/1987 | Wang . |
| 4,751,814 | 6/1988 | Farrell . |
| 4,815,282 | 3/1989 | Wilkinson et al. . |
| 4,827,712 | 5/1989 | Coplin . |
| 4,914,904 | 4/1990 | Parnes et al. . |
| 4,949,544 | 8/1990 | Hines . |
| 5,313,782 | 5/1994 | Frutschi et al. ........................... 60/728 |
| 5,319,925 | 6/1994 | Hendriks et al. ....................... 415/179 |

INTERCOOLED GAS TURBINE ENGINE

This application is a continuation of application Ser. No. 08/139,329 now abandoned filed Oct. 20, 1993, which is a continuation of application Ser. No. 07/883,322 now abandoned, filed May 14, 1992.

TECHNICAL FIELD

The invention relates to a gas turbine engine of improved output horsepower and the method of achieving the improved output horsepower, and more particularly to such a power plant and method using compression intercooling and a speed reduction gear box in the drive train between the compressors.

BACKGROUND ART

The present invention is directed to gas turbine engines of the type having a low pressure compressor, a high pressure compressor downstream of the low pressure compressor, a combustor downstream of the high pressure compressor, a high pressure turbine downstream of the combustor, and a low pressure turbine downstream of the high pressure turbine. The standard configuration for engines of this type is a dual concentric shafting configuration wherein the high pressure turbine drives the high pressure compressor by means of a first shaft, and the low pressure turbine drives the low pressure compressor by means of a second shaft. Commercially available systems of this type are generally highly optimized so that the air and power flows through the compressors and turbines are closely matched. For example, the high pressure turbine generally supplies just the necessary power to drive the high pressure compressor. Similarly, the low pressure turbine supplies the necessary power to drive the low pressure compressor, the remaining power in the low pressure turbine being directed to useful work, i.e. to drive a load.

In one embodiment of such a gas turbine engine, the low pressure turbine is connected directly to the low pressure compressor and directly to the load. An example of such an engine is manufactured by General Electric of Evendale, Ohio, under the designation LM 6000. In another exemplary embodiment of a gas turbine engine of the type to which the present invention is directed, the low pressure turbine is connected only to the low pressure compressor, and a separate power turbine, located downstream of the low pressure turbine, is connected to the load. An example of such an engine is manufactured by General Electric Company of Evendale, Ohio, under the designation LM 5000.

One way to increase the output horsepower of such engines would be to simply burn more fuel. This procedure alone, however, would result in running the system at higher speeds and at higher temperatures than those for which it was designed, with the result being shortened life for the power plant. Taking an existing and optimized gas turbine of either of the types described above and adding to it an intercooler between the low and high pressure compressors would not, in and of itself, solve the problem. This intercooling would cause a reduction in the power requirements to the high pressure compressor, but the high pressure turbine would no longer operate at its designed pressure ratio and its performance would be degraded. In addition, the gas entering the low pressure turbine would be too hot and at too high a pressure, requiring flow function change and which, in turn, may result in reduced life and poor performance of the low pressure turbine.

The present invention is based upon the discovery that the output horsepower of engines of the type described can be significantly augmented by compression intercooling in combination with increasing the load on the high pressure turbine. In other words, if the power requirements of the high pressure compressor are reduced through intercooling by an amount approximating the power requirements of the low pressure compressor, then the high pressure turbine (the flow through which having been returned to approximately design temperature by additional fuel in the combustor) can be used to drive both compressors. The low pressure compressor is disconnected from the low pressure turbine and connected to the high pressure compressor. The low pressure compressor is generally designed to run at a lower speed than the high pressure compressor. When this is the case, the compressor can run at between about ⅕ and about ⅘ the speed of the high pressure compressor. In many instances the low pressure compressor runs at a speed of from about ⅓ to about ½ that of the high pressure compressor. Thus, when the low pressure compressor is designed to run slower than the high pressure compressor, a speed reduction gear box is required in the drive train between the high pressure compressor and the low pressure compressor. As a result of the above, the low pressure turbine is no longer required to drive the low pressure compressor and can be disconnected therefrom. Accordingly, all of the output of the low pressure turbine can be used to drive the attached load directly, or through the agency of a power turbine, if present. Furthermore, since the cooling air to the high pressure turbine will be cooler, the temperature of the flow from the combustor to the high pressure turbine can be increased to increase the efficiency of the engine and its output.

In this fashion, it is possible to take a commercially available multi-shaft gas turbine engine and intercool it in a straightforward and cost effective manner, and therefore achieve the increased power output and efficiency of an intercooled engine. Furthermore, output horsepower improvements of from about 20% to about 40% or more can be achieved without making major changes in the aerodynamic design of the engine or changes in the core hardware which would entail costly development and time-consuming testing. The practice of the present invention would not only enable the building of new engines of improved output horsepower utilizing a preponderance of production parts, but also the conversion of engines in the field to achieve greater output horsepower.

DISCLOSURE OF THE INVENTION

According to the invention, there is provided a gas turbine engine having improved output horsepower and a method of achieving the improved output horsepower. The gas turbine engine is of the type having, in order, a low pressure compressor, a high pressure compressor, a combustor, a high pressure turbine and a low pressure turbine. The high pressure turbine is drivingly connected by drive train means to the high and low pressure compressors and includes a speed reducing gear box in the drive train between the high and low pressure compressors to cause the low pressure compressor to rotate at a lesser speed than the high pressure compressor. Air flow from the low pressure compressor passes through an intercooler to reduce the horsepower requirement of the high pressure compressor by approximately the amount of horsepower required to run the low pressure compressor. The temperature of the intercooled flow is raised in the combustor such that the high pressure turbine has an output horsepower sufficient to run both compressors. The horsepower of the low pressure turbine is devoted to the load driven by the gas turbine engine.

DETAILED DESCRIPTION OF THE INVENTION

Figure 1:
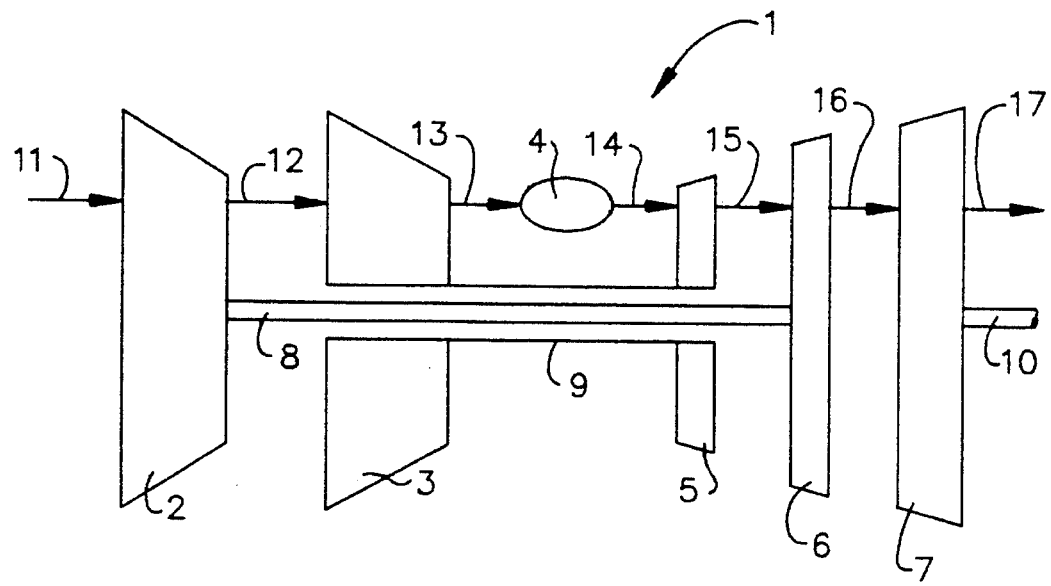
FIG. 1 is a diagramatic representation of one embodiment of the gas turbine engine of the type to which the present invention is directed.

Turning first to FIG. 1, this Figure diagramatically illustrates an exemplary prior art gas turbine engine such as the above noted LM 5000, generally indicated at 1. The engine 1 is of the type mentioned above comprising a low pressure compressor 2, and high pressure compressor 3, a combustor 4, a high pressure turbine 5, a low pressure turbine 6 and a power turbine 7. It will be noted that the low pressure turbine 6 is drivingly connected to low pressure compressor 2 by a shaft 8. Similarly, the high pressure turbine 5 is drivingly connected to the high pressure compressor 3 by concentric shaft 9. The power turbine 7 is connected to a load (not shown) by shaft 10.

Air flow to the low pressure compressor 2 is illustrated by arrow 11. Similarly, air flow from low pressure compressor 2 to high pressure compressor 3 is illustrated by arrow 12. Flow from high pressure compressor 3 to combustor 4 is indicated by arrow 13 and flow from combustor 4 to high pressure turbine 5 is indicated by arrow 14. Flow from high pressure turbine 5 to low pressure turbine 6 is indicated by arrow 15, while flow from low pressure turbine 6 to power turbine 7 is indicated by arrow 16. Flow from power turbine 7 is vented to atmosphere, or elsewhere, as is indicated by arrow 17.

In an exemplary gas turbine engine of the type illustrated in FIG. 1, the low pressure compressor may require about 15,000 horsepower. The high pressure compressor may require about 65,000 horsepower. The high pressure turbine 5, drivingly connected to the high pressure compressor 3, may generate about 65,000 horsepower. The low pressure turbine 6, connected to the low pressure compressor 2, will generate about 15,000 horsepower. Finally, the power turbine will generate about 45,000 horsepower for useful work (i.e. the load). It will be remembered that commercially available systems of the type illustrated in FIG. 1 are generally highly optimized so that the air and power flows through the compressors and turbines are closely matched, as described.

Figure 2:
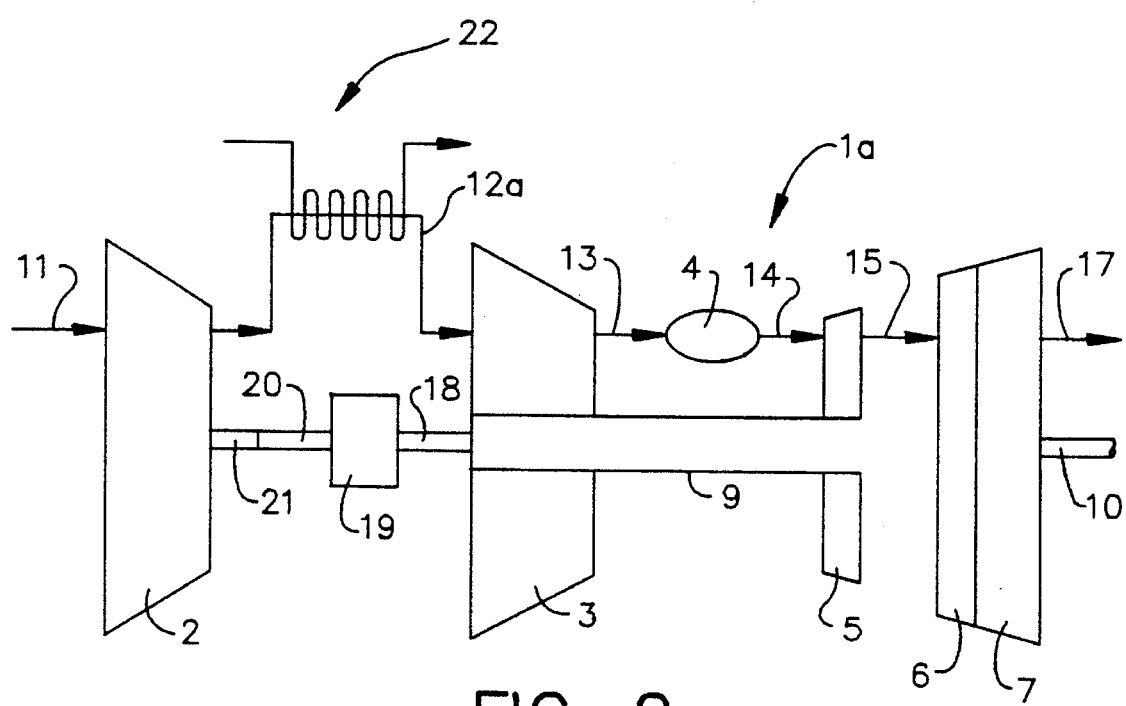
FIG. 2 is a diagramatic representation of the engine of FIG. 1 after modification in accordance with the teachings of the present invention.

FIG. 2 illustrates a gas turbine engine, generally indicated at 1a, which is similar to engine 1 of FIG. 1, but is modified in accordance with the teachings of the present invention. Like parts have been given like index numerals. In FIG. 2, low pressure compressor 2, high pressure compressor 3, combustor 4, high pressure turbine 5, low pressure turbine 6 and power turbine 7 with its shaft 10 are shown. In this instance, however, the shaft 9 connecting the high pressure turbine 5 and high pressure compressor 3 is further connected to the input shaft 18 of a speed reducing gear box 19. The speed reducing gear box 19 has an output shaft 20 connected to the shaft 21 of low pressure compressor 2.

Selection of an appropriate gear box is well within the skill of the ordinary worker in the art. The selection will depend upon the direction of rotation desired, the orientation of the input-output shafts desired, together with the speed of rotation and the horsepower required. With these parameters known, speed reducing gear boxes suitable for this purpose are commercially available. For example, the double reduction gear box manufactured by The Cincinnati Gear Company of Cincinnati, Ohio, under the designation TG56 could be used where appropriate. Again, the type of gear box is not a limitation. It would even be possible to use a gear box wherein the input and output shafts thereof are oriented at an angle with respect to each other, should the arrangement of the engine parts so require.

It will be noted in FIG. 2 that the air flow 12a from the low pressure compressor 2 to the high pressure compressor 3 passes through an intercooler, generally indicated at 22. With cooler air flow to the high pressure compressor, the horsepower required to compress the air by the same pressure ratio is reduced. The air flow 13 from the high pressure compressor to the combustor 4 is reduced in temperature. Through the use of more fuel in combustor 4, its output flow 14 will be raised approximately to design temperature. Since mass flow and pressure have remained substantially constant, the high pressure turbine will provide an output horsepower approximating that of the high pressure turbine of Fig. 1, i.e. about 65,000. In the embodiment illustrated in FIG. 2, the horsepower required by the high pressure compressor 3 is now about 50,000, as opposed to approximately 65,000 horsepower required by the high pressure compressor of FIG. 1. This represents a horsepower drop of about 15,000, which is approximately equal to the horsepower requirement of low pressure compressor 2. As a result, high pressure turbine 5 can now be used to drive both the low pressure compressor 2 and the high pressure compressor 3, with the speed reducing gear box 19 located within the drive train.

Since the low pressure turbine 6 is no longer needed to drive the low pressure compressor 2, it can be disconnected therefrom. The low pressure turbine 6 can, in fact, be physically connected to power turbine 7. The output of the low pressure turbine 6 of about 15,000 horsepower can be added to the output of the power turbine of about 45,000 horsepower to provide a total of about 60,000 horsepower to drive the load. Accordingly, lower pressure turbine 6 functions as a separate power turbine since it is only connected indirectly to the load.

Figure 3:
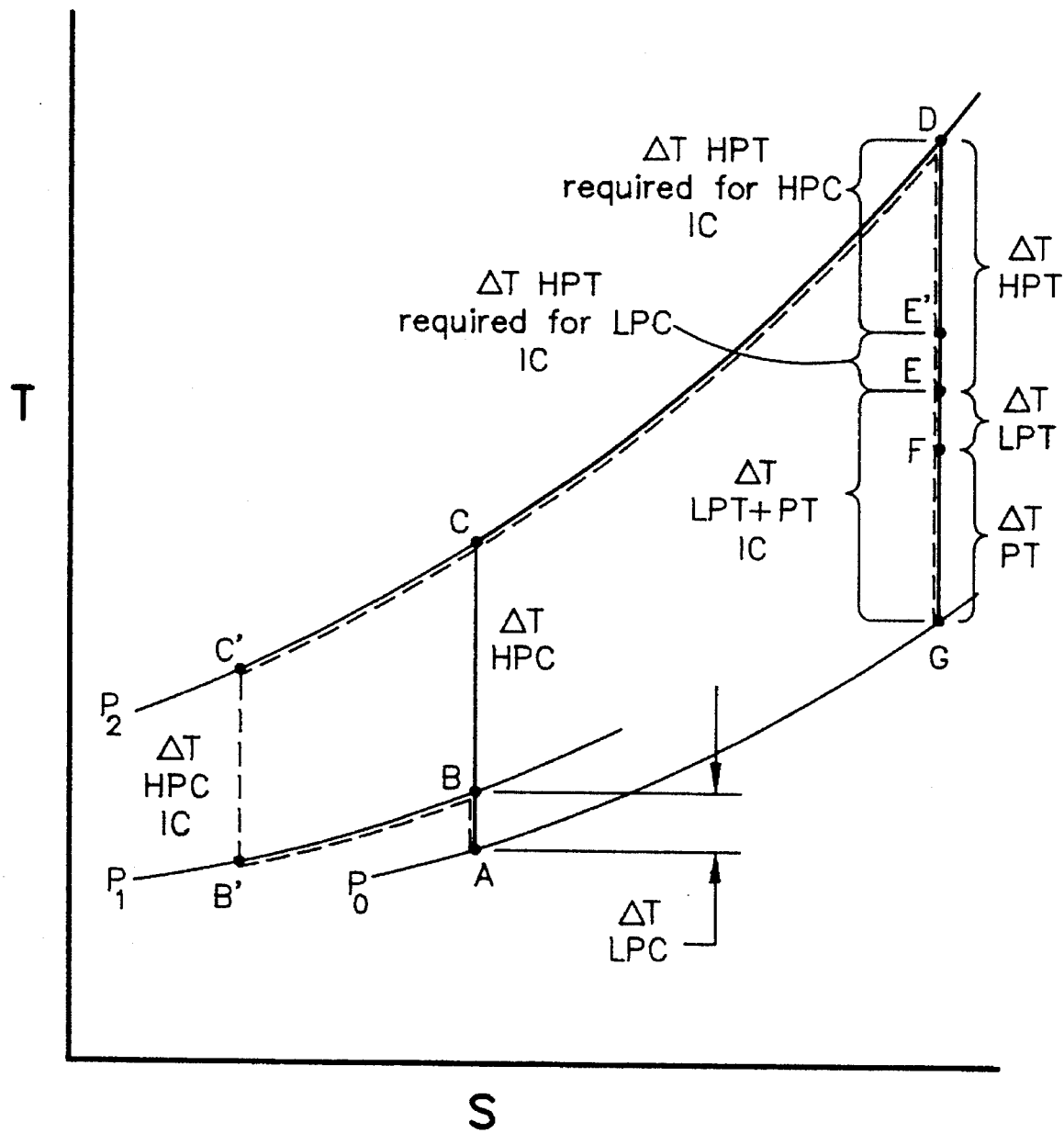
FIG. 3 is an engine cycle chart for the engines of FIGS. 1 and 2.

Reference is now made to the engine cycle chart of FIG. 3, wherein the standard Brayton cycle of the engine of FIG. 1 is illustrated, together with the intercooled cycle of the engine of FIG. 2. The engine cycle chart of FIG. 3 plots temperature (T) versus entropy (S). On the chart three constant pressure lines are indicated at $P_0$, $P_1$ and $P_2$. $P_0$ indicates atmospheric pressure. $P_1$ indicates the pressure of the fluid exiting the low pressure compressor 2. $P_2$ indicates the pressure of the fluid exiting the high pressure compressor 3.

The standard cycle of the engine of FIG. 1 is shown in heavy lines in FIG. 3. Air enters the low pressure compressor 2 at point A constituting atmospheric pressure and ambient temperature. The air is compressed to pressure $P_1$ with a consequent rise in temperature $\Delta T$-LPC, as indicated by point B. The air then passes through the high pressure compressor 3 reaching the high pressure compressor output pressure $P_2$ with a rise in temperature $\Delta T$-HPC, as is indicated at point C. As is known to one skilled in the art, the change in temperature in the low pressure compressor between points A and B is approximately proportional to and may be considered as representational of the horsepower required by the low pressure compressor 2. Similarly, the rise in temperature in the high pressure compressor 3, represented by the line B-C is proportional to the horsepower required by the high pressure compressor 3 and may be considered representational thereof.

At point C, the air from the high pressure compressor 3 enters the combustor 4. The pressure remaining the same, the temperature is raised to point D, which point represents the pressure and temperature of the flow from the combustor.

The flow from the combustor enters the high pressure turbine 5 and the temperature drops to point E. This temperature drop in the high pressure turbine, $\Delta T$-HPT, is representative of the horsepower generated by the high pressure turbine. It will be noted that the horsepower represented by the line B-C is approximately equal to the horsepower represented by the line D-E. This conforms with FIG. 1 wherein the horsepower provided by the high pressure turbine 5 is approximately equal to the horsepower required by the high pressure compressor 3. Flow from the high pressure turbine through the low pressure turbine is represented by the line E-F. The temperature drop across the low pressure turbine $\Delta T$-LPT is representative of the horsepower provided by the low pressure turbine. It will be noted that by assuming nearly equal specific heats for the air and the gas, the line E-F is substantially identical in length to the line A-B. This conforms to FIG. 1 wherein the output horsepower of the low pressure turbine 6 is substantially equivalent to the horsepower required by the low pressure compressor 2. The remaining temperature drop represented by the line F-G represents the temperature drop through the power turbine ($\Delta T$-PT), i.e. the horsepower remaining for shaft 10.

The intercooled cycle for the engine embodiment of FIG. 2 is illustrated in FIG. 3 in dashed lines. Air passing through the low pressure compressor 2 experiences a temperature and pressure rise from point A to point B. $\Delta T$-LPC (i.e. the distance A-B) also represents the horsepower required by the low pressure compressor, which is the same as in the embodiment of FIG. 1. Flow from the low pressure compressor 2 of FIG. 2 passes through intercooler 22 resulting in a temperature loss represented by dashed line B-B' along pressure line $P_1$. From the intercooler 22, the flow passes through high pressure compressor 3 with a change in temperature of ($\Delta T$-HPC-IC) to the point C'. Thus, the flow is cooler and the horsepower B-C' required by high pressure compressor 3 is less than the horsepower B-C of the embodiment of FIG. 1. This conforms to FIG. 2 wherein the horsepower required by the high pressure compressor 3 is 50,000 horsepower as opposed to 65,000 required by the high pressure compressor 3 of FIG. 1.

Flow from the high pressure compressor 3 of FIG. 2 passes through combustor 4 wherein the temperature is raised from C' to point D in FIG. 3. Extra fuel is required to make up for the extra temperature represented by C'-C. With mass flow, pressure and temperature at design point D, the temperature loss through the high pressure turbine is again represented by the distance D-E. Thus, the horsepower generated by the high pressure turbine is the same as in the embodiment of FIG. 1. It will be immediately noted, however, that the length of the line D-E is made up of two segments D-E' and E'-E. D'-E' is, in horsepower representation, equivalent in length to B'-C' and represents that amount of the output horsepower of the high pressure turbine 5 used to run the high pressure compressor 3. E'-E is equivalent in length to A-B and represents that amount of the output horsepower of high pressure turbine 5 used to run low pressure compressor 2. Thus, in the intercooled engine 1a of FIG. 2, the output horsepower of the high pressure turbine 5 is sufficient to run both the high pressure compressor 3 and the low pressure compressor 2, with the speed reducing gear box 19 assuring the desired speed of the low pressure compressor 2. Flow from the high pressure turbine through the low pressure turbine undergoes a temperature drop which is the same as the temperature loss in the non-intercooled embodiment of FIG. 1 ($\Delta T$-LPT) and is again represented by the line E-F. In similar fashion, the temperature drop through the power turbine is the same as the temperature drop ($\Delta T$-PT) in the non-intercooled version and is represented by the line F-G. Therefore, the output horsepowers of the low pressure turbine 6 and the power turbine 7 remain unchanged. Nevertheless, since the output horsepower of the low pressure turbine 6 is no longer needed to run the low pressure compressor 2, it can be added to the output horsepower of the power turbine 7. As a result, the output horsepower of the intercooled gas turbine engine of FIG. 2 is approximately 33% greater than that of the non-intercooled engine of FIG. 1.

It will be understood by one of ordinary skill in the art that the engine cycles illustrated in the chart of FIG. 3 are perfect cycles which do not take into account inefficiencies and losses and the changes in these inefficiencies and losses as the cycle parameters change. The differences in inefficiencies and losses can be easily compensated for by adjustments of various elements and functions of the engine. For example, angular adjustment of the inlet guide vanes (not shown) may be made with respect to the low pressure compressor 2 and the high pressure compressor 3. Similarly, angular adjustments can be made of the inlet nozzles (not shown) of the high pressure turbine 5 and the low pressure turbine 6. Adjustment of the speed of rotation of the low pressure compressor 2 can be made by means of the speed reducing gear box 19 and its appropriate selection. The amount of intercooling can be controlled, as well as the amount of additional heating in combustor 4. These and other adjustments are well known to the skilled worker in the art and are made not only to compensate for changes in losses and inefficiencies, but also to achieve the maximum output horsepower without exceeding the design limits of the engine parts. None of these adjustments would require costly or time consuming testing.

The discharge air of the high pressure compressor at C' will be from about 100° F. to about 300° F. cooler than the discharge air of the high pressure compressor in the non-intercooled embodiment (represented by point C). The discharge air of the high pressure compressor constitutes the source of most of the cooling air for the high pressure turbine with the result that the high temperature parts of the high pressure turbine will be cooler. This gives the potential to increase fuel to the combustor to increase the high pressure turbine inlet temperature (point D) by an amount corresponding to an amount which is one or two times the amount by which the cooling air has been cooled and still maintain the high pressure turbine parts at design temperature. This increase in the basic cycle temperature will yield a further increase in output power and efficiency of the engine.

Figure 4:
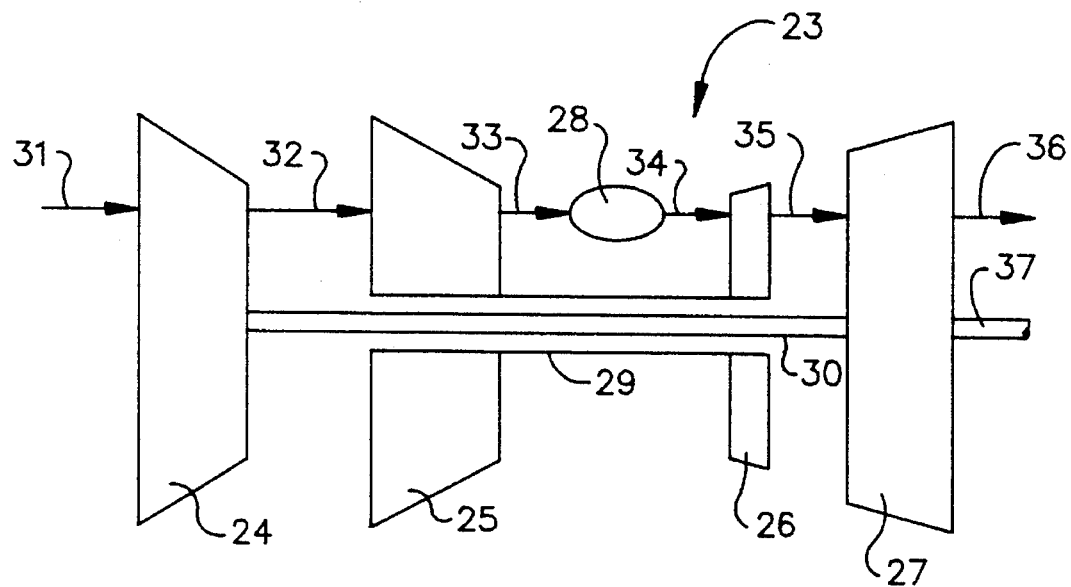
FIG. 4 is a diagramatic representation of another embodiment of gas turbine engine to which the present invention is directed.

FIG. 4 illustrates the second basic embodiment of gas turbine engine mentioned in the preamble portion of this specification and similar to the above noted LM 6000. The LM 6000 is capable of driving out of its cold or hot end. In the embodiment illustrated in FIG. 4 the engine is shown driving out of its hot end. The engine, generally indicated at 23, comprises a low pressure compressor 24, a high pressure compressor 25, a high pressure turbine 26 and a low pressure turbine 27. The engine 23 is provided with a combustor 28. The high pressure turbine 26 is drivingly connected to the high pressure compressor 25 by shaft 29. Similarly, the low pressure turbine 27 is drivingly connected to the low pressure compressor 24 by concentric shaft 30 and to the load by shaft 37. The flow through the engine is represented by arrows 31, 32, 33, 34, 35 and 36. A commercially available engine of the type illustrated in FIG. 4 is generally highly optimized, as indicated above. To this end, in an exemplary embodiment, the high pressure compressor 25 may have a horsepower requirement of about 75,000 horsepower. The output of the high pressure turbine 26 will also be about 75,000 horsepower. The low pressure compressor 24 will require about 15,000 horsepower and the low pressure turbine 27 will have an output of about 70,000 horsepower. 15,000 of this 70,000 horsepower will be used to run the low pressure compressor 24. The remaning 55,000 horsepower of the low pressure turbine 27 can be used for useful work (i.e. to drive an appropriate load).

Figure 5:
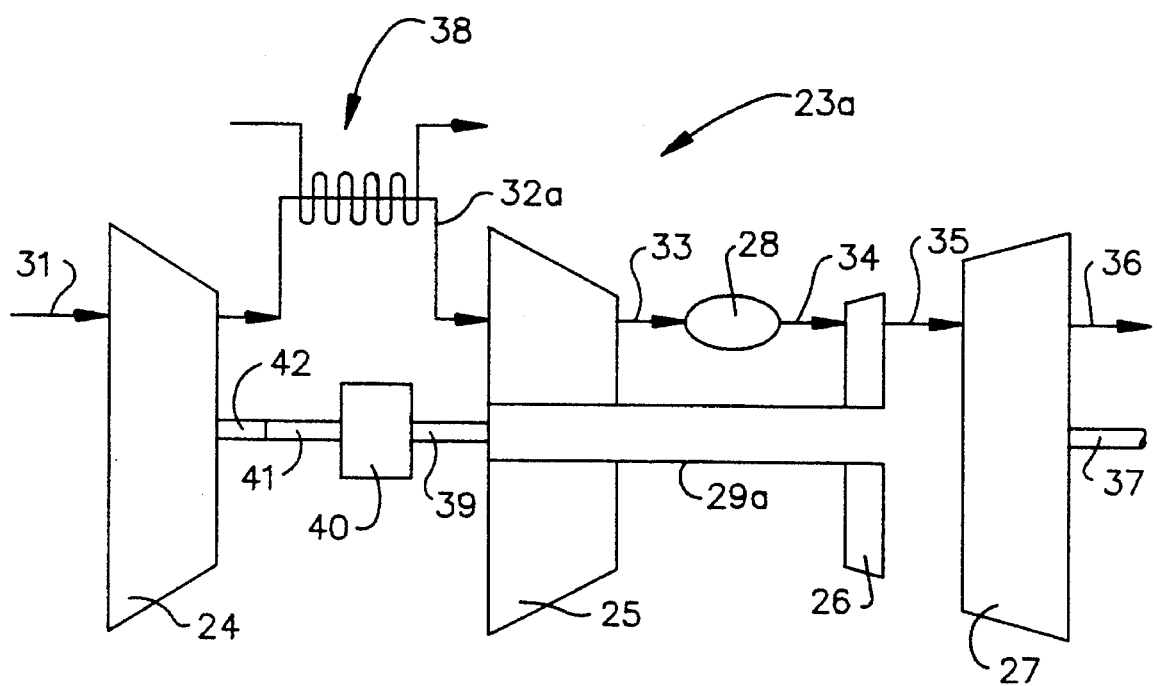
FIG. 5 is a diagramatic representation of the engine of FIG. 4 modified in accordance with the teachings of the present invention.

FIG. 5 illustrates an intercooled embodiment of the gas turbine engine of FIG. 4. In FIG. 5, the gas turbine engine is generally indicated at 23a. Those parts which are similar to the corresponding parts of the embodiment of FIG. 4 have been given the same index numerals.

The primary differences between the embodiment of FIG. 5 and the embodiment of FIG. 4 can be set forth as follows. First of all, the flow from the low pressure compressor 24 to the high pressure compressor 25, as indicated by arrow 32a, passes through an intercooler generally indicated at 38. It will further be noted that the shaft 30 interconnecting the low pressure turbine 27 and the low pressure compressor 24 has been eliminated. Finally, the shaft 29a interconnecting the high pressure turbine 26 and the high pressure compressor 25 is additionally operatively and drivingly connected to the low pressure compressor 24. To this end, the shaft 29a is connected to the input shaft 39 of a speed reducing gear box 40. The output shaft 41 of the speed reducing gear box is connected to a shaft 42 of the low pressure compressor 24.

The engines of FIGS. 4 and 5 will have engine cycles quite similar to those illustrated in the chart of FIG. 3. In an ideal situation, the horsepower requirement of the low pressure compressor 24 will remain at about 15,000 horsepower. Intercooling of the flow to the high pressure compressor 25 will reduce its horsepower requirement from about 75,000 horsepower to about 60,000 horsepower, a reduction of about 15,000 horsepower, (i.e. equivalent in amount to the horsepower requirement of the low pressure compressor 24). Additional fuel in the combustor will cause the cooled air entering the combustor to exit at about its design temperature and, assuming no change in mass flow or pressure, the high pressure turbine 26 will have about the same output horsepower as in the embodiment of FIG. 4 (i.e. about 75,000 horsepower), which is equivalent to the combined horsepower requirements of the high pressure compressor 25 and the low pressure compressor 24. The low pressure turbine 27 will have an output horsepower equivalent to that of the embodiment of FIG. 4 (i.e. 70,000 horsepower). In this instance, however, a part of this output horsepower no longer need be used to run the low pressure compressor 24, with the result that the full 70,000 horsepower output of the low pressure turbine 27 can be directed to shaft 37 and the load. Accordingly, lower pressure turbine 27 functions solely as a power turbine since it is only connected directly to the load.

When the engine of FIG. 5 is fully adjusted and optimized, the above noted horsepower figures may change somewhat. For example, the horsepower requirment of the low pressure compressor 24 may be about 20,000 horsepower. The horsepower requirement of the high pressure compressor 25 will be about 60,000 horsepower and the horsepower output of the high pressure turbine 26 may be about 80,000 horsepower. The output horsepower of the low pressure turbine 27 (which also serves as the power turbine) will increase to about 70,000 horsepower.

Figure 6:
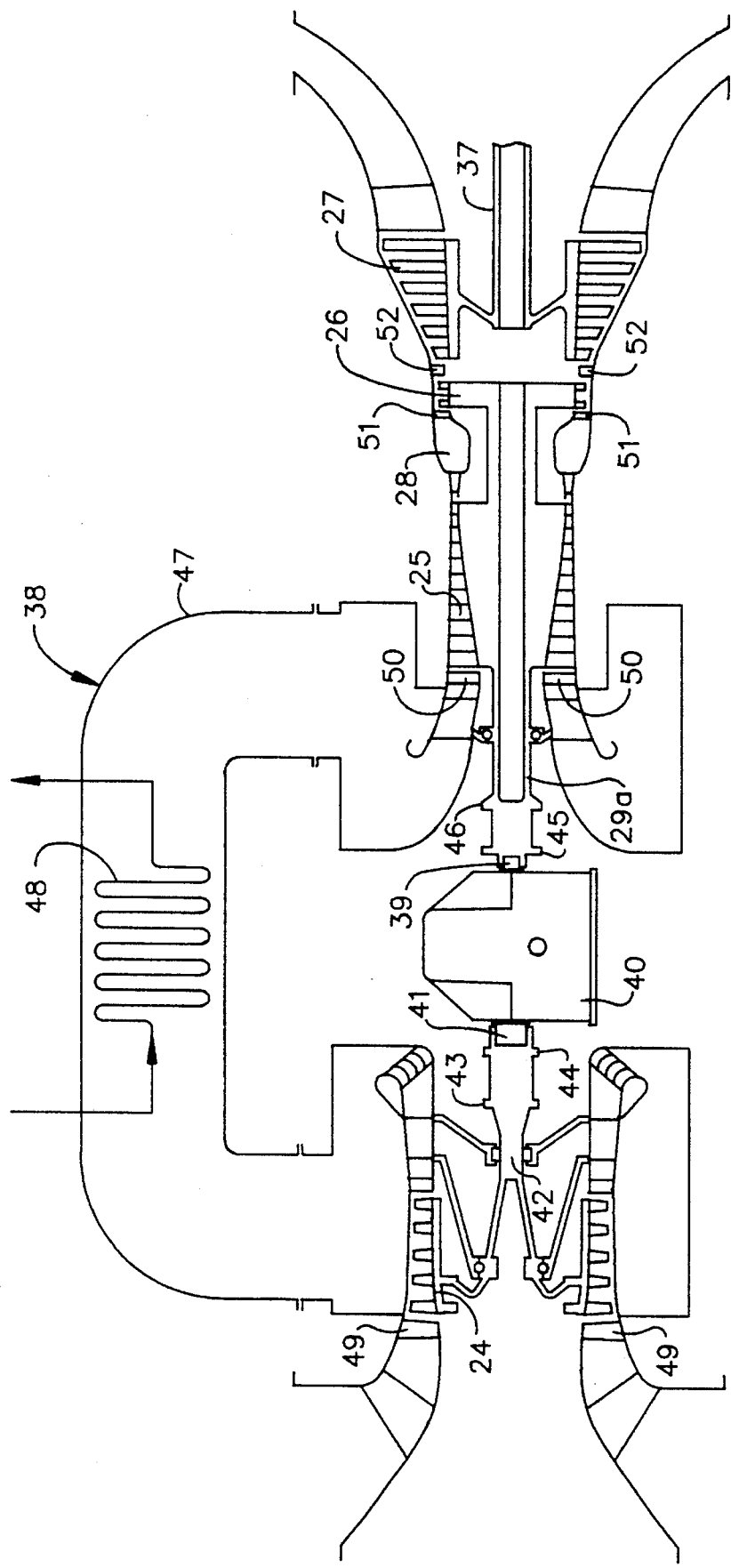
FIG. 6 is a simplified representation of the gas turbine engine of FIG. 5.

FIG. 6 is a simplified illustration of a gas turbine engine of the type diagramatically illustrated in FIG. 5. In FIG. 6, the low pressure compressor 24 is shown with its shaft 42. The speed reducing gear box 40 is illustrated with its output shaft 41 connected to the shaft 42 of the low pressure compressor 24 by means of a pair of flexible couplings 43 and 44. The input shaft 39 of the speed reducing gear box 40 is shown connected to the shaft 29a of the high pressure compressor 25 by means of a pair of flexible couplings 45 and 46. The pairs of couplings 43-44 and 45-46 generally each take the form of a unitary, double ended structure. The output airflow of the low pressure compressor 24 is connected to the input of the high pressure compressor 25 via a duct 47 containing a heat exchanger 48. The duct 47 and heat exchanger 48 comprise an exemplary intercooler 38. Any other appropriate intercooling means can be used.

FIG. 6 further illustrates the combustor 28, high pressure turbine 26, low pressure turbine 27 and its output shaft 37.

The inlet guide vanes of the low pressure compressor 24 are illustrated at 49. The inlet guide vanes for the high pressure compressor 25 are illustrated at 50. Inlet nozzles for the high pressure turbine 26 are shown at 51 and inlet nozzles for the low pressure turbine 27 are shown at 52.

FIG. 6 could also be considered a representation of the gas turbine engine of FIG. 2. The primary difference would lie in the fact that the turbine indicated at 27 in FIG. 6 should be considered to be the combination of low pressure turbine 6 and power turbine 7.

Modifications may be made in the invention without departing from the spirit of it.

What is claimed:

1. A derivative gas turbine engine derived from a non-intercooled gas turbine engine designed for a specified non-intercooled Brayton engine cycle comprising:

a low pressure compressor;

a high pressure compressor disposed downstream of said low pressure compressor;

a combustor disposed downstream of said high pressure compressor in direct flow communication therewith;

a high pressure turbine disposed downstream of said combustor and connected to said high pressure compressor by a first shaft;

a low pressure turbine disposed downstream of said high pressure turbine in flow communication therewith;

said low pressure compressor, high pressure compressor, combustor, high pressure turbine, and low pressure turbine originating from said non-intercooled engine and being effective for operating in said non-intercooled cycle having a specified design point for combustion gases discharged from said combustor into said high pressure turbine, said design point including a design temperature, a design pressure, and a design mass flow, and said non-intercooled cycle being based on said low pressure turbine being connected to said low pressure compressor by a second shaft except that said derivative gas turbine engine is characterized by the absence of said second shaft;

said low pressure compressor instead being connected to said high pressure compressor by a speed reduction gear box for driving said low pressure compressor at a lower speed than said high pressure compressor;

an intercooler disposed in flow communication between said low pressure compressor and said high pressure compressor for cooling compressed air discharged from said low pressure compressor and provided to said high pressure compressor to reduce horsepower required for said high pressure compressor;

said combustor being effective for providing additional heating by additional fuel so that said intercooled cycle includes at least said design point of said non-intercooled cycle, and said high pressure turbine is effective for producing about the same horsepower as in said non-intercooled cycle and for powering both said high pressure compressor and said low pressure compressor at said design point, with horsepower developed in said low pressure turbine being available for powering a load.

2. The gas turbine engine claimed in claim 1 wherein said intercooler comprises a duct between said low pressure and high pressure compressors and a heat exchanger within said duct.

3. The gas turbine engine claimed in claim 1 wherein said speed reduction gear box causes said low pressure compressor to rotate at from about ⅕ to about ⅘ the speed of said high pressure compressor.

4. The gas turbine engine claimed in claim 1 wherein said speed reduction gear box causes said low pressure compressor to rotate at from about ⅓ to about ½ the speed of said high pressure compressor.

5. An engine according to claim 1 wherein said gear box has input and output shafts connected to said low pressure compressor and said high pressure compressor by flexible couplings.

6. An engine according to claim 1 wherein said low pressure compressor and said high pressure compressor are multistage axial compressors.

7. An engine according to claim 1 further comprising means originating from said non-intercooled gas turbine engine for cooling said high pressure turbine using discharge air from said low pressure compressor; and said combustor is effective for receiving yet additional fuel to increase inlet temperature of said high pressure turbine to a temperature greater than said non-intercooled cycle design temperature to further increase output power and efficiency in said intercooled gas turbine engine.

8. An engine according to claim 7 wherein said high pressure turbine inlet temperature is increased by an amount corresponding to at least the amount by which said intercooler cools said compressed air.

9. An engine according to claim 1 further comprising inlet guide vanes for said low pressure compressor, inlet guide vanes for said high pressure compressor, an inlet nozzle for said high pressure turbine, and an inlet nozzle for said low pressure turbine, all having angular orientations for achieving maximum output horsepower from said intercooled gas turbine engine without exceeding design limits thereof.

10. An engine according to claim 1 wherein said low pressure turbine is connected directly to said load.

11. An engine according to claim 1 further comprising:

a separate power turbine disposed downstream of said low pressure turbine, with said low pressure turbine and said power turbine originating from said non-intercooled engine operable in said non-intercooled cycle; and said low pressure turbine is connected directly to said power turbine for collectively powering said load connectable thereto.

12. A method of converting a non-intercooled gas turbine engine designed for a specified non-intercooled Brayton engine cycle to an intercooled gas turbine engine having an intercooled Brayton engine cycle for increasing output power, said non-intercooled engine including:

a low pressure compressor;

a high pressure compressor disposed downstream of said low pressure compressor;

a combustor disposed downstream from said high pressure compressor in direct flow communication therewith;

a high pressure turbine disposed downstream of said combustor and connected to said high pressure compressor by a first shaft;

a low pressure turbine disposed downstream of said high pressure turbine in flow communication therewith and connected to said low pressure compressor by a second shaft; and said non-intercooled cycle having a specified design point for combustion gases discharged from said combustor into said high pressure turbine, said design point including a design temperature, a design pressure, and a design mass flow;

said method comprising:

eliminating said second shaft between said low pressure compressor and said low pressure turbine;

connecting said low pressure compressor to said high pressure compressor by a speed reduction gear box for driving said low pressure compressor at a lower speed than said high pressure compressor;

providing an intercooler in flow communication between said low pressure compressor and said high pressure compressor for cooling compressed air discharged from said low pressure compressor and provided to said high pressure compressor to reduce horsepower required for said high pressure compressor; and adjusting heating ability of said combustor by additional fuel so that said intercooled cycle includes at least said design point of said non-intercooled cycle, and said high pressure turbine is effective for producing about the same horsepower as in said non-intercooled cycle and for powering both said high pressure compressor and said low pressure compressor at said design point, with horsepower developed in said low pressure turbine being available for powering a load.

13. The method claimed in claim 12 including the step of directly connecting said low pressure turbine to said load.

14. The method claimed in claim 12 wherein said non-intercooled gas turbine engine is of the type having a separate power turbine downstream of said low pressure turbine and connected directly to said load, and including the step of connecting said low pressure turbine directly to said power turbine for collectively powering said load.

15. A method according to claim 12 wherein said gear box has input and output shafts connected to said low pressure compressor and said high pressure compressor by flexible couplings.

16. A method according to claim 12 wherein said low pressure compressor and said high pressure compressor are multistage axial compressors.

17. A method according to claim 12 wherein:

said non-intercooled gas turbine engine further includes means for cooling said high pressure turbine using discharge air from said low pressure compressor; and said combustor is effective for receiving yet additional fuel to increase inlet temperature of said high pressure turbine to a temperature greater than said non-intercooled cycle design temperature to further increase output power and efficiency in said intercooled gas turbine engine.

18. A method according to claim 17 wherein said high pressure turbine inlet temperature is increased by an amount corresponding to at least the amount by which said intercooler cools said compressed air.

19. A method according to claim 12 wherein said non-intercooled gas turbine engine further includes inlet guide vanes for said low pressure compressor, inlet guide vanes for said high pressure compressor, an inlet nozzle for said high pressure turbine, and an inlet nozzle for said low pressure turbine, and said method further comprises providing angular adjustments in said inlet guide vanes of said low pressure compressor and said high pressure compressor, and in said inlet nozzles of said high pressure turbine and said low pressure turbine for achieving maximum output horsepower from said intercooled gas turbine engine without exceeding design limits thereof.

* * * * *